(12) United States Patent  
Clark et al.

(10) Patent No.: US 7,894,781 B1  
(45) Date of Patent: *Feb. 22, 2011

(54) HIGH-SPEED TWO-WAY POINT-TO-POINT TRANSMISSION

(75) Inventors: Martin Vivian Clark, Boston, MA (US); Thomas Edward Darcie, Fair Haven, NJ (US); Lawrence Joel Greenstein, Edison, NJ (US); Carol Catalano Martin, Fair Haven, NJ (US); Thomas M. Willis, III, Tinton Falls, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/462,966

(22) Filed: Aug. 12, 2009

Related U.S. Application Data

(63) Continuation of application No. 11/237,047, filed on Sep. 28, 2005, now Pat. No. 7,620,375, which is a continuation of application No. 10/193,457, filed on Jul. 10, 2002, now Pat. No. 7,006,804.

(51) Int. Cl.  
*H04B 1/02* (2006.01)

(52) U.S. Cl. .......................... 455/105; 455/61; 455/272

(58) Field of Classification Search ................... 455/50, 455/60, 63.1, 63.4, 101, 103, 105, 272, 276.1  
See application file for complete search history.

(56) References Cited

U.S. PATENT DOCUMENTS

| | | | |
|---|---|---|---|
| 7,006,804 B1 * | 2/2006 | Clark et al. ................. | 455/105 |
| 7,620,375 B1 * | 11/2009 | Clark et al. ................. | 455/105 |
| 2002/0101908 A1 * | 8/2002 | Kim et al. .................... | 375/147 |
| 2003/0224750 A1 * | 12/2003 | Sampath ................... | 455/276.1 |

* cited by examiner

*Primary Examiner*—Nhan Le  
(74) *Attorney, Agent, or Firm*—Ronald D. Slusky

(57) ABSTRACT

Multiple-input/multiple-output (MIMO) antenna technology is used in a point-to-point radio link to provide higher data rates than would otherwise be achievable in a similar system that did not use MIMO antenna technology. Particular embodiments of the invention implement channel coding, dual polarization, adaptive receiver combining and adaptive power control.

18 Claims, 7 Drawing Sheets

HIGH-SPEED TWO-WAY POINT-TO-POINT TRANSMISSION

CROSS-REFERENCE TO RELATED APPLICATION

This is a continuation of U.S. patent application Ser. No. 11/237,047 filed Sep. 28, 2005 now U.S. Pat. No. 7,620,375 which was a continuation of patent application Ser. No. 10/193,457 filed Jul. 10, 2002 now U.S. Pat. No. 7,006,804.

BACKGROUND OF THE INVENTION

The present invention relates to methods and arrangements that provide digital communication links between fixed points.

In order to extend a high-bandwidth/high-data-rate communication path from its main network out to the premises of, for example, an enterprise customer or a campus containing a number of enterprise customers, a telecommunications carrier will typically lay a fiber optic cable connecting the network to the customer premises. If terrain or other considerations preclude the use of fiber, an alternative is to set up a horn-antenna-based microwave link. However, data rates as high as the so-called OC-48 rate of 2.488 Gb/s, or even the Gigabit Ethernet/OC-12 rate of 622 Mb/s—which are often required in order to meet the needs of enterprise customers—are difficult to achieve using microwave links because bandwidths that such microwave links can support are limited and rain attenuation can be high at frequencies above 10 GHz.

SUMMARY OF THE INVENTION

In accordance with the present invention, we have recognized that so-called multiple-input/multiple-output (MIMO) antenna technology can be used in a point-to-point radio link to provide higher data rates than would otherwise be achievable in a similar system that did not use MIMO antenna technology. In particular, by using appropriate signal processing at the receive end of the link, an N×N MIMO system—having N transmit antennas and N receive antennas—can realize an N-fold increase the data-carrying-capability of a system.

If desired, techniques such as channel coding, dual polarization, adaptive receiver combining and adaptive power control can be included in a system embodying the principles of the invention. Such techniques would allow even greater data rates to be achieved than a system embodying the principles of the invention but not having those additional features. Indeed, we have found that by using a 2×2 MIMO system, pursuant to the principles of the present invention, in conjunction with such other techniques, it is possible to achieve OC-48 rates with minimal impact on existing services, with very high spectral efficiencies (specifically up to 10 b/s/Hz) over point-to-point links of, for example, about 1.5 to 8 kilometers with very high reliability (99.999%) corresponding to a bit error rate of $10^{-12}$.

MIMO technology is not new. However, the focus of those working on MIMO technology has not been point-to-point applications, but mobile applications such as cellular telephony. At the heart of MIMO is the use of cancellation techniques that allow separate signals to be transmitted within a common frequency band and yet be separately recoverable at the receiver. In order for the technique to work, however, so-called diversity is required. By this is meant that the characteristics of the signals appearing at the various receive antennas must differ from each other in some way, e.g., their carriers are out of phase with respect to one another or their amplitudes are different. The cellular environment, in particular, is characterized by a rich scattering environment. Signals between the base station and the mobile handset reflect off of buildings and topographic features that cause signals to arrive at the receive antennas with different amplitudes and phases, thus providing a significant degree of multipath diversity. It was at least in part the existence of multipath diversity in the cellular environment that led those developing sophisticated MIMO techniques in recent years to believe that MIMO could be an effective technique to boost the data rates supported of cellular networks.

Given such considerations, it is not surprising that it remained for the present inventors to recognize that MIMO techniques could be advantageously used in a high-data-rate point-to-point environment—one that is quite different from the cellular environment. For example, unlike in the cellular environment, a point-to-point path exhibits virtually no multipath diversity. We have recognized, however, that effects other than scattering can be looked to to provide the necessary diversity. In particular, we have recognized that spatial diversity is a form of diversity that can be realistically achieved in systems of the type in question by providing appropriate separation of the transmit antennas from one another and/or of the receive antennas from one another. Thus we have realized that the multipath diversity that is so crucial for effective implementation of MIMO in the cellular environment is not necessary for the point-to-point environment. In particular, for links of about 1.5 to 8 kilometers, the distance between transmit antennas and/or between receive antennas can be in the range of about 1 to 10 meters for systems operating at carrier wavelengths of about 24 millimeters, corresponding to carrier frequencies at about 12.45 GHz. Such antenna spacing makes it practical to install the MIMO antennas and their associated cabling on a building rooftop or similar structure.

And then there is the question of data rate. Here again it remained for the present inventors to appreciate that a system that has "proven in" in one environment—cellular communications—can be advantageously applied in a system whose operating parameters are so very different. In particular, even a data rate in the hundreds of Kb/s range that is envisioned for next-generation cellular systems is a far cry from the 2.488 Gb/s OC-48 rate or even anything like it.

Particular embodiments of the invention utilize a 2×2 MEMO system—that is, a MIMO system having two transmit antennas and two receive antennas. First and second versions of the signal transmitted from one of the transmit antennas arrive at respective ones of the receive antennas over different-length paths, the difference in path length being a distance $d_a$. Similarly, first and second versions of the signal transmitted from the other one of the transmit antennas arrive at respective ones of the receive antennas over different-length paths, that difference in path length being an amount $d_b$. It is advantageous for the four antennas to be arranged in such a way that the sum of $d_a$ and $d_b$ is at least close, if not exactly equal, to an odd multiple of half the carrier wavelength, $\lambda$, i.e., $\lambda/2$, $3\lambda/2$, $5\lambda/2$, etc. Meeting this criterion maximizes the signal-to-noise ratio of each signal being recovered when canceling out the other signal.

DETAILED DESCRIPTION

Figure 1:
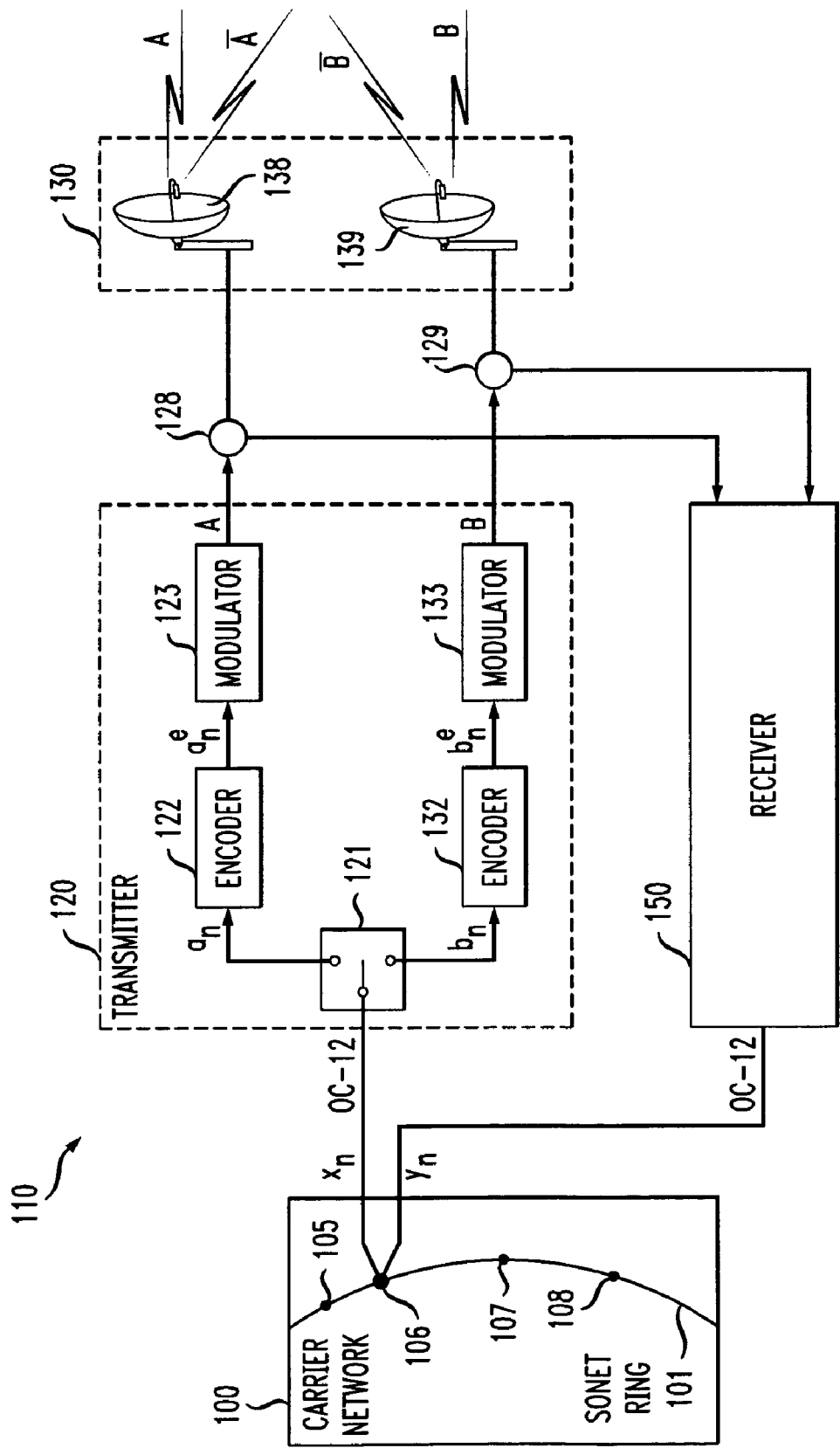
FIGS. 1 and 2, when arranged with FIG. 1 to the left of FIG. 2, show a telecommunication system embodying the principles of the present invention.
Figure 2:
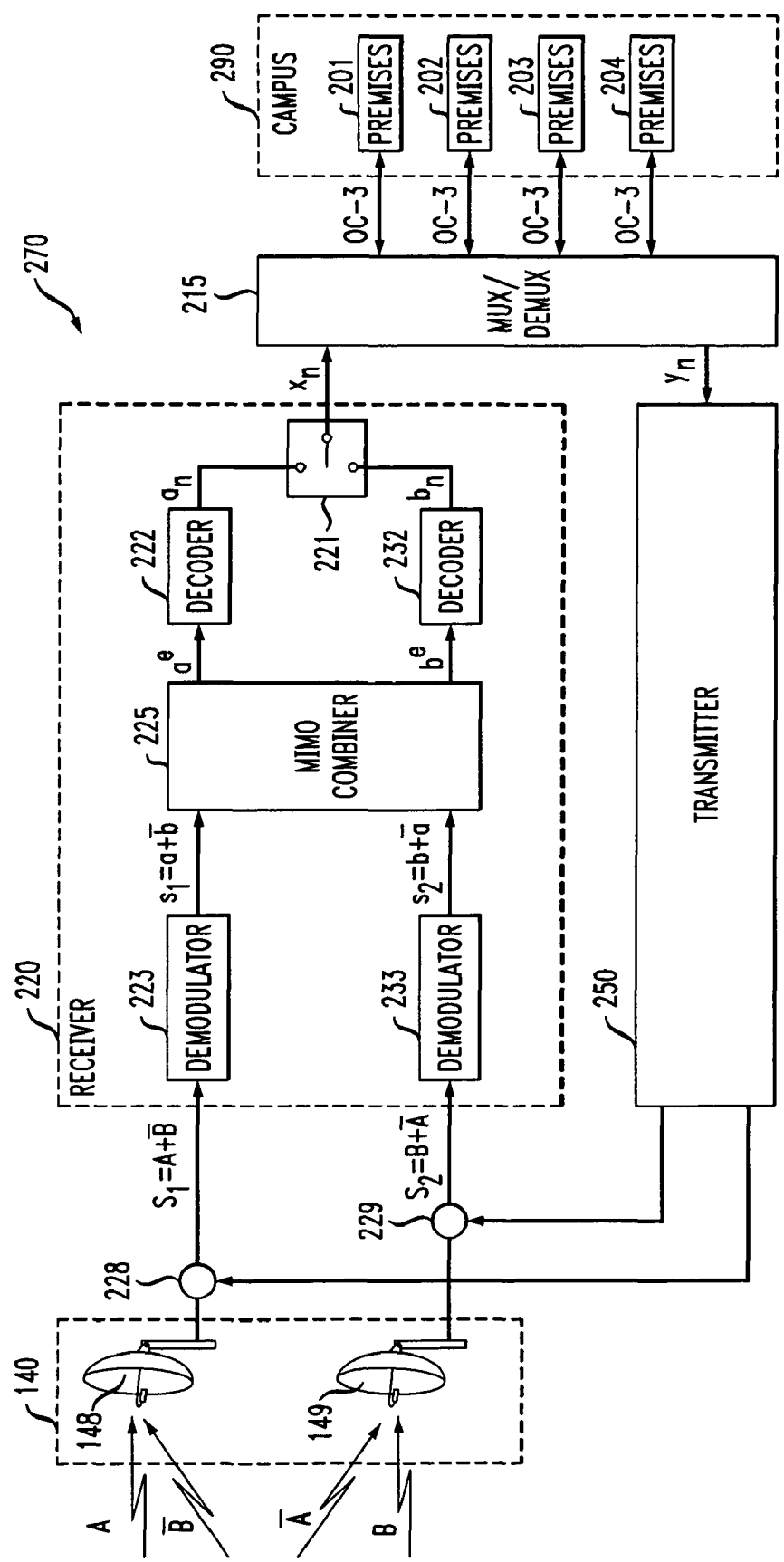

The arrangement shown in FIGS. 1-2 includes a service provider's carrier network 100 having optical communication paths and equipment including SONET ring 101. The latter has nodes 105 through 108. It is desired to communicate the bit stream contained within a 622 Mb/s OC-12 signal $x_n$ appearing at node 106 (hereinafter referred to as an OC-12 bit stream) to individual enterprise customer premises 201 through 204 which are in relatively close proximity to one another within, for example, a corporate campus 290 that is located at a distance from node 106—illustratively between about 1.5 to 8 kilometers. To this end, the 622 Mb/s OC-12 signal is applied to a transmitter 120 of a transmitter 110 installed in, for example, a utility room or in an outdoor enclosure near antenna system 130 described below. Within transmitter 120, a demultiplexer 121 divides the OC-12 bit stream $x_n$ into two bit, or data, streams $a_n$ and $b_n$. Bit stream $a_n$ is channel-encoded by encoder 122. Encoder 122 illustratively applies a rate ¾ convolutional code to the bit stream and the resulting encoded bit stream $a^e_n$ is modulated by modulator 123, illustratively using four-phase phase-shift keying (QPSK) modulation. The resulting QPSK modulated radio-frequency signal A is applied to transmit antenna 138 of fixed antenna system 130 via switch point 128. Bit stream $b_n$ is similarly channel-encoded by encoder 132 to generate encoded bit stream $b^e_n$, which is then similarly modulated by modulator 133. The resulting QPSK modulated radio-frequency signal B is applied to transmit antenna 139 of transmit antenna system 130 via switch point 129. The modulated signals generated by modulators 123 and 133 occupy, i.e., have energy in, the same, i.e., fully overlapping, frequency bands, illustratively having a bandwidth of about 500 MHz and a carrier wavelength of about 24 millimeters, corresponding to a carrier frequency of about 12.45 GHz. Thus in this example, signals A and B both have energy across the band from about 12.20 GHz to about 12.70 GHz.

Antennas 138 and 139 are directional antennas pointed in the direction of, i.e., aimed at, fixed antenna system 140 situated on or near corporate campus 290. Each of antenna systems 130 and 140 may be located on, for example, a building top, tower, or other location providing for a clear line-of-sight propagation path, or link, between them. Antenna system 140 includes antennas 148 and 149. A portion of the energy of signal A launched by antenna 138 propagates to, and is received by, antenna 148. Another portion of the energy of signal A launched by antenna 138, denoted as signal $\overline{A}$, propagates to, and is received by antenna 149. Similarly, a portion of the energy of signal B launched by antenna 139 propagates to, and is received by, antenna 149. Another portion of the energy of signal B launched by antenna 138, denoted as signal $\overline{B}$, propagates to, and is received by, antenna 148.

As set forth in detail below, the geometric spacing of antennas 138, 139, 148 and 149 is such that the two versions of signal A—namely signals A and $\overline{A}$—arrive at antenna system 140 with significantly different carrier phase and likewise for the two versions of signals B—namely signals B and $\overline{B}$. As will be seen below, this allows the two data streams $a_n$ and $b_n$ to be independently recovered in the receiver even though signals A and B occupy the same frequency band.

The superposition of signals A and $\overline{B}$ received at antenna 148 is a signal $S_1 = (A+\overline{B})$ that is passed to receiver 220 of transceiver 270 installed in, for example, a utility room or in an outdoor enclosure near antenna system 140. Signal $S_1$, more particularly, is applied to demodulator 223 of receiver 220 thereof via switch point 228. Demodulator 223 may include not only demodulation circuitry but equalization and other types of circuitry conventionally used in radio-frequency communication systems The resulting superposed baseband signal $s_1 = (a+\overline{b})$ is applied to MIMO combiner 225. Similarly, the superposition of signals B and $\overline{A}$ received at antenna 149 is a signal $S_2 = (B+\overline{A})$ that is also passed to receiver 220 and, particularly, to demodulator 233 thereof via switch point 229. The resulting superposed baseband signal $s_2 = (b+\overline{a})$ is also applied to MIMO combiner 225. The processing performed by MIMO combiner 225 is described hereinbelow. For the present it suffices to note that MIMO combiner 225 outputs signals $a^e$ and $b^e$. Signal $a^e$ is a sequence of signal values each representing an estimate of the coordinates in complex signal space of one of the four channel symbols generated by modulator 123 from the QPSK constellation. Signal $b^e$ is similarly a sequence of signal values each representing an estimate of the coordinates in complex signal space of one of the four channel symbols generated by modulator 133 from, illustratively, that same constellation. Signals $a^e$ and $b^e$ are applied to decoders 222 and 232, respectively. These are illustratively Viterbi decoders that in known fashion recover the original bit streams $a_n$ and $b_n$ from signals $a^e$ and $b^e$, respectively. The two bit streams are recombined by multiplexer 221 to reconstruct bit stream $x_n$ that originated at node 106. Bit stream $x_n$ is, in turn, applied to multiplexer/demultiplexer (mux/demux) 215, which divides bit stream $x_n$ into individual OC-3 bit streams that are extended to respective ones of the premises 201 through 204.

The system communicates data not only from carrier network 100 to corporate campus 290, as just described, but in the other direction as well. To that end, transceiver 270 further includes a transmitter 250 essentially identical to transmitter 120 and transceiver 110 further includes a receiver 150 essentially identical to receiver 220. OC-3 data streams supplied from customer premises 201 through 204 are combined into a single OC-12 bit stream $y_n$ by mux/demux 215. The subsequent processing of bit stream $y_n$ is essentially identical to that described above for bit stream $x_n$. Bit stream $y_n$ is divided into two constituent bit streams that are individually encoded and modulated by transmitter 250. The system is illustratively a time-division duplex (TDD) system, which means that data communications are carried out in one direction at a time. Thus, the resulting modulated signals are applied via switch points 228 and 229—which are now configured to pass signals in the opposite direction from before—to antennas 148 and 149 now serving as the transmit antennas. The signals launched by antennas 148 and 149 are received by antennas 138 and 139 and are applied to receiver 150 via switch points 128 and 129—which are now also configured to pass signals in the opposite direction from before. Receiver 150 provides bit stream $y_n$ to node 106 of SONET ring 106.

Operating in a TDD mode is advantageous in applications in which only a single continuous band of frequencies is available for communications in both directions. This is because dividing a continuous band into two portions so as to allow for simultaneous communication in two directions would mean wasting a certain amount of the available bandwidth in order to provide a guard band between the two portions of the band. By operating in a TDD mode, the full band is available for communications in each direction, albeit for only (on average) half the time. Thus, subject to regulatory approval, a system embodying the principles of the invention and utilizing TDD could advantageously use frequency bands heretofore envisioned for one-way communications, such as satellite television.

In order for MIMO combiner 225 to recover signals $a^e$ and $b^e$ from baseband superposed signals $s_1$ and $s_2$, it is necessary that signals A and $\overline{A}$ differ in at least one parameter value upon their arrival at antenna system 140. Likewise for signals B and $\overline{B}$. In the present embodiment, as noted earlier, the geometric spacing of antennas 138, 139, 148 and 149 is such that signals A and $\overline{A}$ arrive at antenna system 140 with significantly different carrier phase, and likewise for signals B and $\overline{B}$. In the present embodiment, in particular, the carrier phase of signal $\overline{A}$ at antenna 149 is illustratively 90 degrees behind, i.e., delayed with respect to, that of signal A at antenna 148. Similarly, the carrier phase of signal $\overline{B}$ at antenna 148 is illustratively 90 degrees behind, i.e., delayed with respect to, that of signal B at antenna 149. More generally, in illustrative embodiments of the invention the delay, or phase shift is substantially equal to an odd multiple of 90°, i.e., 90×(2n−1)° for n=1, 2, 3 . . . , namely 90°, 270°, 450°, etc.

The phase difference between the two versions of signals A and between the two versions of signals B allows the two data streams $a_n$ and $b_n$ to be independently recovered in the receiver even though signals A and B occupy the same frequency band. In particular, as noted earlier, MIMO combiner 225 operates on the baseband versions of $S_1$ and $S_2$, namely the signals $s_1 = (a + \overline{b})$ and $s_2 = (b + \overline{a})$. As a result of QSPK-modulated signal A and its 90°-delayed version $\overline{A}$ being two-dimensional—that is, being signals that can be represented as having so-called in-phase and quadrature-phase components—it can be shown that, at baseband, signal $\overline{a}$ is 90-degrees delayed in phase relative to signal a. Thus in complex notation $\overline{a} = -ja$. Similarly, $\overline{b} = -jb$. We can thus write $$s_1 = (a - jb) \quad (1)$$

$$s_2 = (b - ja) \quad (2)$$

Thus MIMO combiner 225 can recover signals a and b by forming combinations of $s_1$ and $s_2$ as follows:

$$a = (s_1 + j s_2)/2 \quad (3)$$

$$b = (s_2 + j s_1)/2 \quad (4)$$

Signals a and b as recovered by MIMO combiner 225 pursuant to Eqs. (3)-(4) are, in fact, the same as signals $a^e$ and $b^e$.

Figure 3:
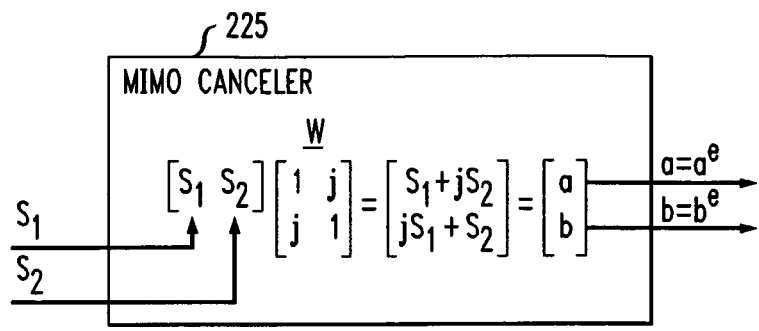
FIG. 3 shows an embodiment of the MIMO combiner used in the system of FIGS. 1-2.
Figure 4:
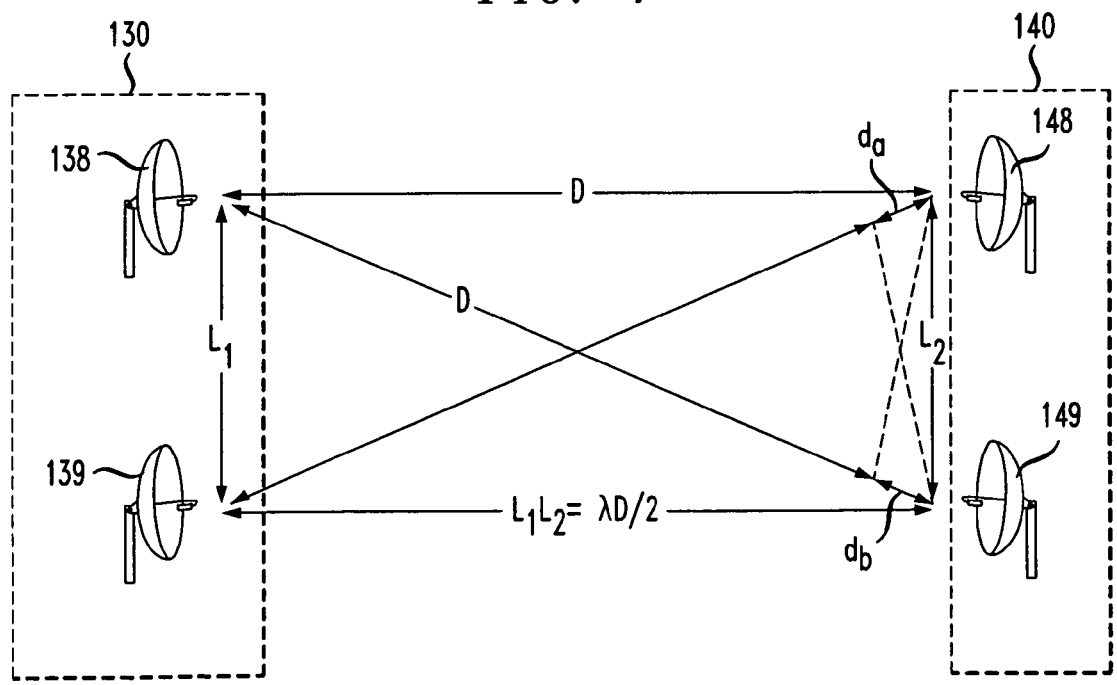
FIG. 4 shows the geometric relationships among the transmit and receive antennas within the systems of FIGS. 1-2 and FIGS. 5-6.

The representation of MEMO combiner 225 shown in FIG. 3 expresses the processing represented by Eqs. (3)-(4) carried out therein in terms of a matrix multiplication, where the matrix W is the so-called weighting matrix. In many practical embodiments of the invention, MIMO combiner 225 will generate signals a and b pursuant to Eqs. (3)-(4) just as shown. It should be appreciated, however, that this approach represents an engineering approximation. In particular, the phase delay that results from the geometric arrangement of antennas 138, 139, 148 and 149 will be exactly 90° at only one wavelength—illustratively the center wavelength of the transmission band. In order to more precisely take account of the phase delays occurring at wavelengths across the entire band, matrix W in FIG. 3 (and matrix $W^f$ discussed below) would have the quantity $-e^{j\omega\tau}$ in place of $-j$, where $\omega$ is the radian frequency and $\tau = d/c$, d being the distance as shown in. FIG. 4 (discussed below) and c being the speed of propagation—approximately the speed of light. The distance d is chosen such that $\omega d/c$ is $\pi/2$, or 90 degrees. Multiplication by $-e^{-j\omega\tau}$ can be readily achieved using a filter. It turns out that for a carrier frequency of 12.45 GHz and a signal bandwidth of 500 MHz, the amount of distortion introduced by using the simplified matrix W shown in FIG. 3 is negligible. In cases where the relative bandwidth is larger, and the distortion correspondingly greater, the distortion can be compensated for while still using the simplified matrix W shown in FIG. 3 by employing a simple fixed equalizer at either end of the link.

FIG. 4 shows the geometric relationships among the fixed locations of antennas 138, 139, 148 and 149. For a given range, D—the distance between antenna systems 130 and 140—we desire antenna separations $L_1$ and $L_2$ such that the sum of the distances $d_a$ and $d_b$ is equal to half a wavelength or some odd multiple thereof of a frequency within the transmission band, such as the center frequency, this being equivalent to an odd multiple of 180 degrees of that frequency. That is, $$d_a + d_b = n\lambda/2, \quad (5)$$

where n is an odd integer. Indeed, in the example above, it was tacitly assumed that $d_a = d_b$, inasmuch as, in that example, the two versions of each transmitted signal arrive at the receive antenna system with a 90° phase shift between them, thereby achieving the aforementioned total of 180°. This is not necessary, however.

For the case of n=1, for example, meeting the criterion set forth in Eq. (5) is achieved by designing the system such that the criterion $$L_1 L_2 = (\lambda D/2)$$

is met. Thus for the spacing of the antennas of a particular one of the antenna systems we have, $$L_1 = (\lambda D/2)/L_2$$

For example, for a system operating at a carrier frequency of 12.45 GHz, corresponding to a wavelength $\lambda$ of about 24 millimeters, with a range of D=8 km, the distance between antennas should be $L_1 = L_2 = 10$ m, while for D=2 km, we get $L_1 = L_2 = 5$m.

There is no requirement for $L_1$ and $L_2$ to be equal. Indeed allowing for the possibility of unequal $L_1$ and $L_2$ permits the antennas to be closer at the premises end, i.e., corporate campus 290 in the illustrative embodiment, where rooftop space may be less available, and farther apart at the service provider, or carrier network, end. Typical embodiments of the invention will have $1 \leq L_1 \leq 10$ meter and the same for $L_2$. It is envisioned that in typical installations $1.5 \leq D \leq 8$ km. Of course, the invention is not limited to those particular values.

As noted earlier, the fixed, point-to-point communication system of FIGS. 1-2 may incorporate various techniques and technologies that, in conjunction with the MIMO technique pursuant to the principles of the present invention, can enable the system to achieve a desired level of performance at a given bit rate, channel bandwidth etc. Among these is the use of some form of channel coding, such the convolutional coding provided by encoders 122 and 132. Various other techniques, however, may advantageously be used.

For example, in the system as described hereinabove, antenna systems 130 and 140 are single-polarization antennas. However, dual-polarization antennas may be used instead. Using dual-polarization antennas (either vertical-horizontal polarizations or slant 45° polarizations), link capacity can be doubled over the case where single-polarization antennas are used, by transmitting independent signals within the same frequency band on each polarization.

Figure 5:
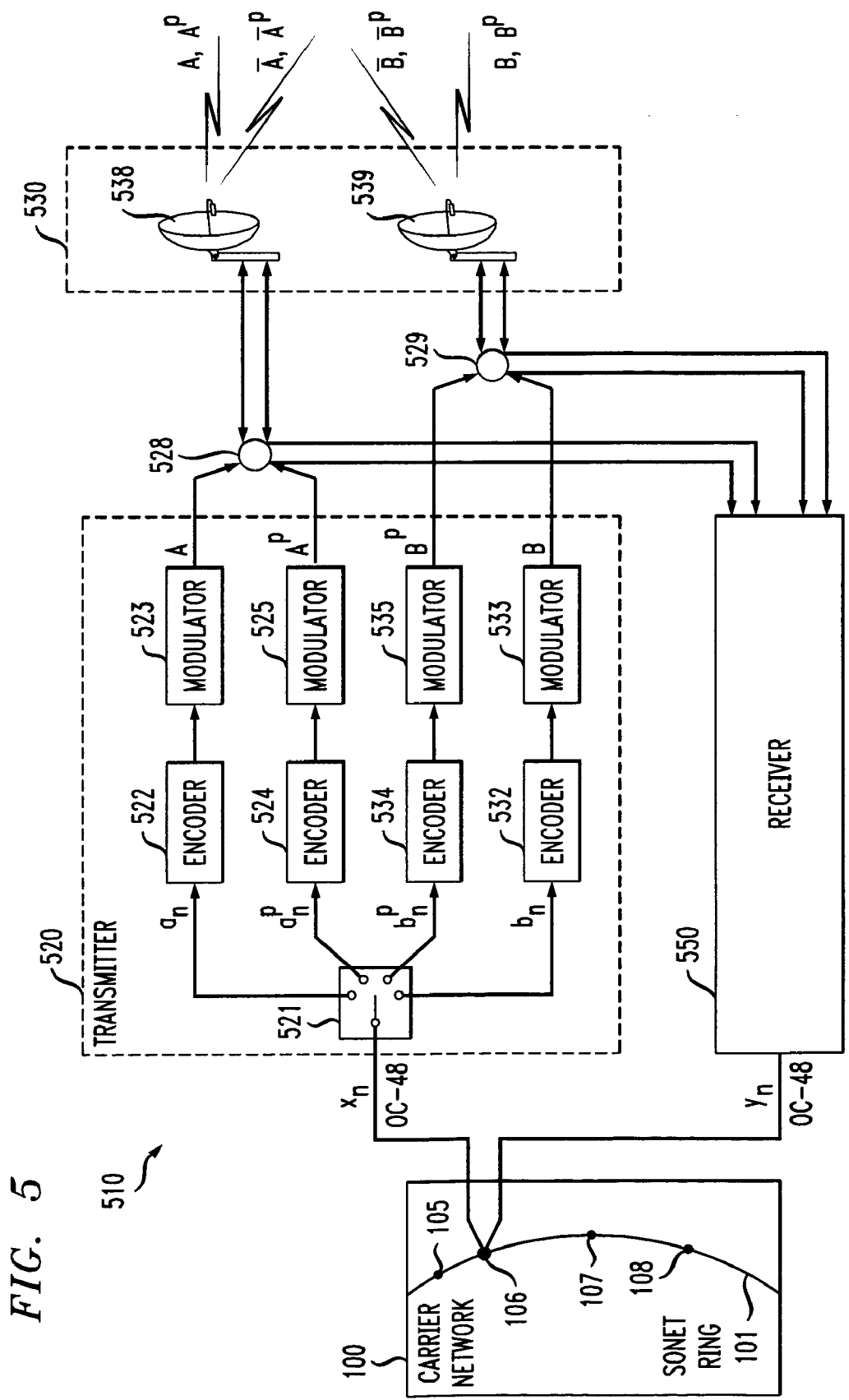
FIGS. 5 and 6, when arranged with FIG. 5 to the left of FIG. 6, show another telecommunication system embodying the principles of the present invention.
Figure 6:
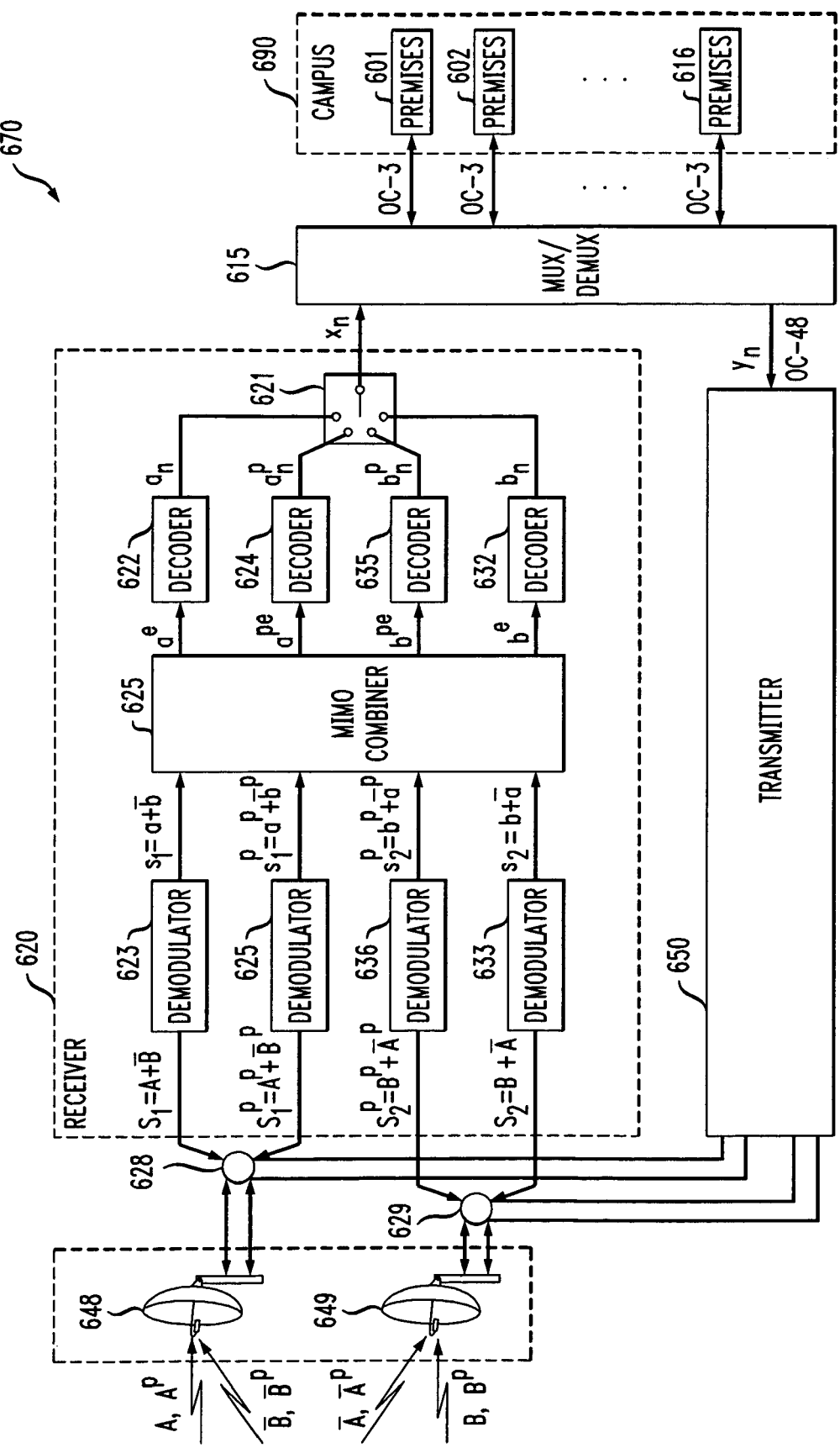

A telecommunications system embodying the principles of the invention and using dual-polarization antennas is shown in FIGS. 5-6. Now signal $x_n$ appearing at node 106 is an OC-48, 2.488 Gb/s bit stream that is to be communicated to individual enterprise customer premises 601 through 616 on a corporate campus 690. Transmitter 520 of transceiver 510 is generally similar to transmitter 220 of FIG. 2. It includes a demultiplexer 521 that divides the OC-48 bit stream $x_n$ into four bit streams $a_n$, $a^p_n$, $b^p_n$ and $b_n$ encoded by encoders 522, 524, 534 and 532, respectively and modulated by modulators 523, 525, 535 and 533, respectively. The encoders illustratively implement a rate ¾ trellis code and the modulators illustratively implement 16-QAM modulation. The four-fold increase in data rate supported by the system of FIGS. 5-6 as compared to that of FIGS. 1-2 is the result of the use of dual polarization antennas and the use of the ¾ rate trellis code and larger (16-point rather than 4-point) signaling constellation.

The modulator outputs are signals A, $A^p$, $B^p$ and B. Antennas 538 and 539 of antenna system 530 are dual-polarized antennas. Signals A and B are applied to elements of antennas 538 and 539, respectively, that transmit with a first polarization and signals $A^p$ and $B^p$ are applied to elements of antennas 538 and 539, respectively, that transmit with a second polarization.

Antennas 648 and 649 at the other end of the link are also dual-polarized. The two elements of antenna 648 supply signals $S_1 = (A+\overline{B})$ and $S^p_1 = (A^p+\overline{B^p})$ to receiver 620 within transceiver 670. These signals are, in particular, applied to demodulators 623 and 625, respectively, via switch point 628. Similarly, the two elements of antenna 649 supply signals $S_2 = (B+\overline{A})$ and $S^p_2 = (B^p+\overline{A^p})$ to demodulators 636 and 633, respectively, via switch point 629. MIMO combiner 625 receives baseband signals $s_1 = (a+\overline{b})$, $s_2 = (b+\overline{a})$, $s^p_1 = (a^p+\overline{b^p})$ and $s^p_2 = (b^p+\overline{a^p})$. MIMO combiner 625 outputs signals $a^e$, $a^{pe}$, $b^{pe}$ and $b^e$—sequences of signal values each representing an estimate of the coordinates in complex signal space of one of the sixteen channel symbols generated by modulators 523, 525, 535 and 533, respectively from the 16-QAM constellation. Signals $a^e$, $a^{pe}$, $b^{pe}$ and $b^e$ are applied to decoders 622, 624, 635 and 632, respectively—illustratively Viterbi decoders—that recover the original bit streams $a_n$, $a^p_n$, $b_n$, and $b^p_n$. These four bit streams are recombined by multiplexer 621 to reconstruct bit stream $x_n$ that originated at node 106. Bit stream $x_n$ is, in turn, applied to multiplexer/demultiplexer (mux/demux) 615, which divides bit stream $x_n$ into individual OC-3 bit streams that are extended to respective ones of the premises 601 through 616.

Transceiver 670 further includes a transmitter 650 essentially identical to transmitter 520 and transceiver 510 further includes a receiver 550 essentially identical to receiver 620. OC-3 data streams supplied from customer premises 601 through 616 are combined into a single OC-48 bit stream $y_n$ by mux/demux 615. The subsequent processing of bit stream $y_n$ is essentially identical to that described above for bit stream $x_n$. Bit stream $y_n$ is divided into four constituent bit streams that are individually encoded and modulated by transmitter 650. Again, the system is illustratively a time-division duplex (TDD) system. Thus, the resulting modulated signals are applied via switch points 628 and 629—which are now configured to pass signals in the opposite direction from before—to antennas 648 and 649 now serving as the transmit antennas. The signals launched by antennas 548 and 549 are received by antennas 538 and 539 and are applied to receiver 550 via switch points 528 and 529—which are now also configured to pass signals in the opposite direction from before. Receiver 550 provides bit stream $y_n$ to node 106 of SONET ring 106.

In general, a system using dual polarization will experience some level of cross-polarization, particularly under rain conditions. Accordingly, the known technique of adaptive cross-polarization cancellation should be used in the system of FIGS. 5-6. At the same time, it is to be noted that changes in the medium, i.e., changes in atmospheric conditions between the two antenna systems, can alter the seemingly fixed transmission characteristic of the channel when the system utilizes multiple polarizations. This suggests using a 4×4 adaptive weighting matrix to control for both cross-polarization and changes in the transmission characteristics of the channel.

Figure 7:
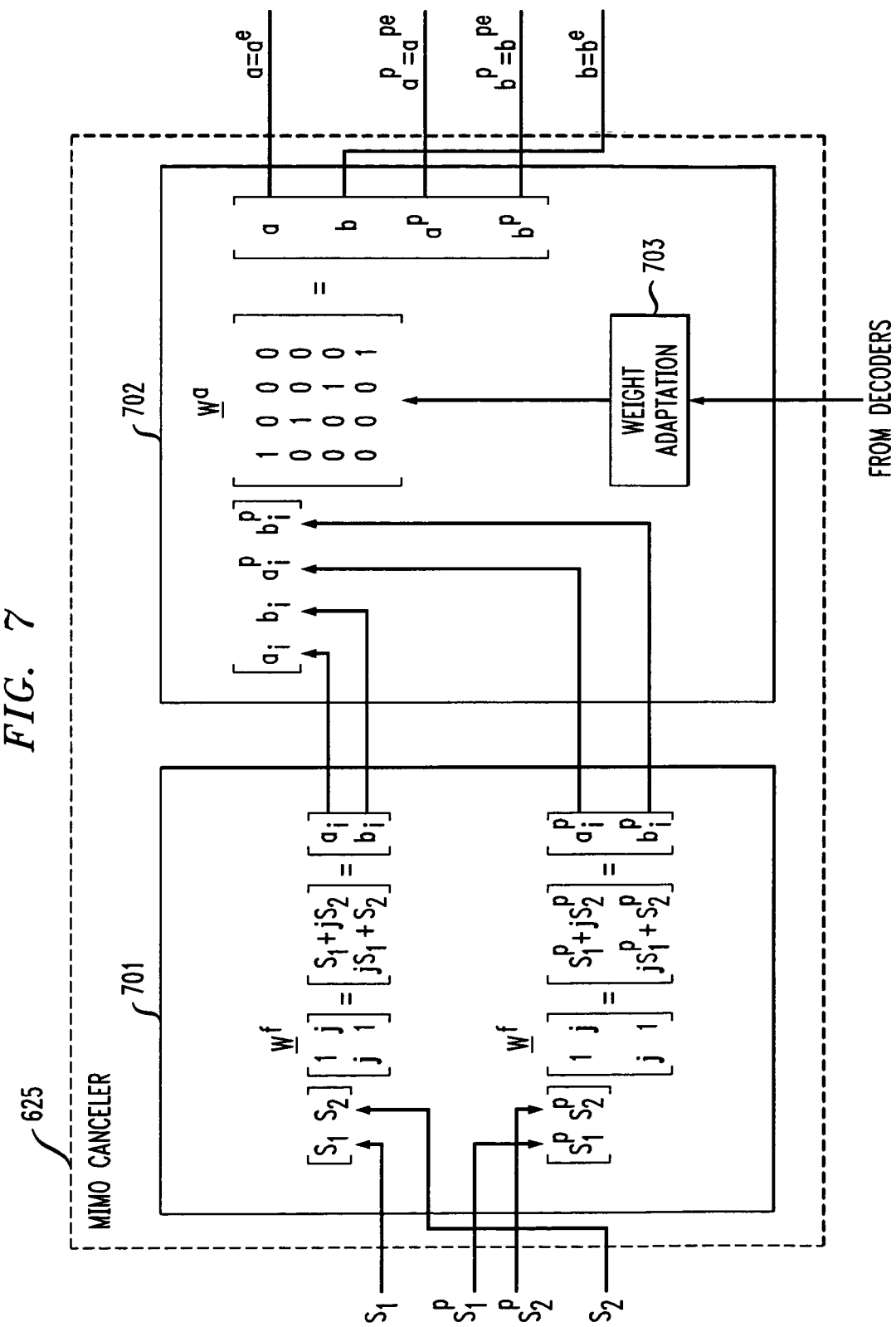
FIG. 7 shows an embodiment of the MIMO combiner used in the system of FIGS. 5-6.

An embodiment of MIMO combiner 625 implementing such an adaptive receiver combining approach is shown in FIG. 7. A first weighting stage 701 uses the same fixed 2×2 weighting matrix as shown in FIG. 3 for each polarization—here denoted $W^f$—to generate intermediate values of the recovered baseband signals, denoted $a_j$, $b_j$, $ap_j$ and $b^p_j$. These are then passed to a second stage 702 in which those four signals are combined using a 4×4 adaptive weighting matrix $W^a$. to provide four outputs $a = a^e$, $b = b^e$, $a^p = a^{pe}$ and $b^p = b^{pe}$. The elements of matrix $W^a$ are adapted over time in known fashion by weight adaptation circuit 703 in response to error signals provided from decoders 622, 624, 635 and 632. See, for example, J. H. Winters, "Optimum combining in digital mobile radio with cochannel interference," *IEEE J. Selected Areas in Communications*, vol. SAC-2, July 1984, and J. H. Winters, "Signal acquisition and tracking with adaptive arrays in the digital mobile radio system IS-54 with flat fading," *IEEE Trans. on Vehicular Technology*, vol. VT-42, November 1993. Under perfect conditions, matrix $W^a$ would be the identity matrix, as shown in FIG. 7. The identity matrix values may be used as initial values that will adapt over time to match the system and transmission medium conditions that actually obtain. The benefit of the approach of using separate fixed and adaptive weighting matrices is that all four inputs to the adaptive weighting circuit will have reasonably high signal-to-noise ratios and, thus, reasonably low bit error rates. This will permit simple decision-directed adaptation of the weights without requiring overhead-consuming training sequences.

In particular implementations of the invention, such as that disclosed herein in which time-division duplex (TDD) is used, signal propagation will be essentially identical in both directions. That is, there is channel reciprocity at the same frequency. Advantageously, then, all the adaptation can be done at the service provider's end of the link, thereby simplifying the premises-end equipment. In particular, the adaptive weighting matrix $W^a$ can be determined and implemented at the service provider's receiver, and then used in the transmitter at the same end to pre-weight the signals sent to the premises end. That way, no adaptive processing is needed at the premises end of the link.

Another implementational consideration is power control. In particular, advantageous system performance will be achieved by having the system use adaptive transmit power control, so that each channel uses only as much transmit power as is needed. It was noted earlier that the system illustratively operates in a time-division duplex (TDD) mode. Thus signals are transmitted in the first direction of communication for a fixed period of time in the first half of an overall transmission frame and then in the other direction for a like period of time in the second half of the frame. An advantageous consequence is that no information needed for power control need be passed between ends of the link, under normal operating conditions.

When the system is first powered on or if communication between the two ends should fail for any reason, a closed loop feedback mechanism for power control will be needed to initially set correct power levels. This mechanism will require power control information to be transmitted between the two ends of the radio link. However once initialized, the system can use an open loop power control system requiring no information overhead to maintain the correct power levels. If needed, the closed loop system could be exercised periodically to reinitialize the power to their proper levels.

In one example of an open loop adaptive power control arrangement, either the power or the output signal-to-noise ratios of signals received at one end of the link can be noted during one half of a frame. Based on what is observed, the circuitry at this end of the link can increment its transmit power up or down. However, it makes no change until the following frame. That way, the other end will see the same conditions (e.g., received powers and output SNR's) in the second half of the frame, make the same power control decisions, and also exercise them in the following frame. In that following frame, both ends will again see the same conditions, and should make the same decisions.

That this approach provides effective power control can be understood as follows: If, in the first half frame, the receiver at one end of the link observes an SNR that is too low, for example, and immediately transmits in the second half of the frame with a higher power than it had been, the receiver at the other end will experience a better SNR and thus will not know that it should increase its transmit power. Delaying making a change until the next frame avoids this problem.

Since each receiver can monitor what the transmitter at the other end has done, it can verify that the same power control decisions have been made at both ends. Whenever a receiver makes a change in its transmit power level, it should monitor the power from the other side to ensure a similar change has been made. If a different decision is detected, it can be corrected by obeying the following two rules: 1) If a receiver detects that the transmitter at the other end has increased power but it had not done so at its end, then it should also increase power in the next frame to match the other end. 2) If a receiver does not detect that the transmitter at the other end has also decreased power after it has done so, then it should return to its previous power level to match the other end. Following this approach should keep the power control levels identical at each end of the radio link.

Figure 8:
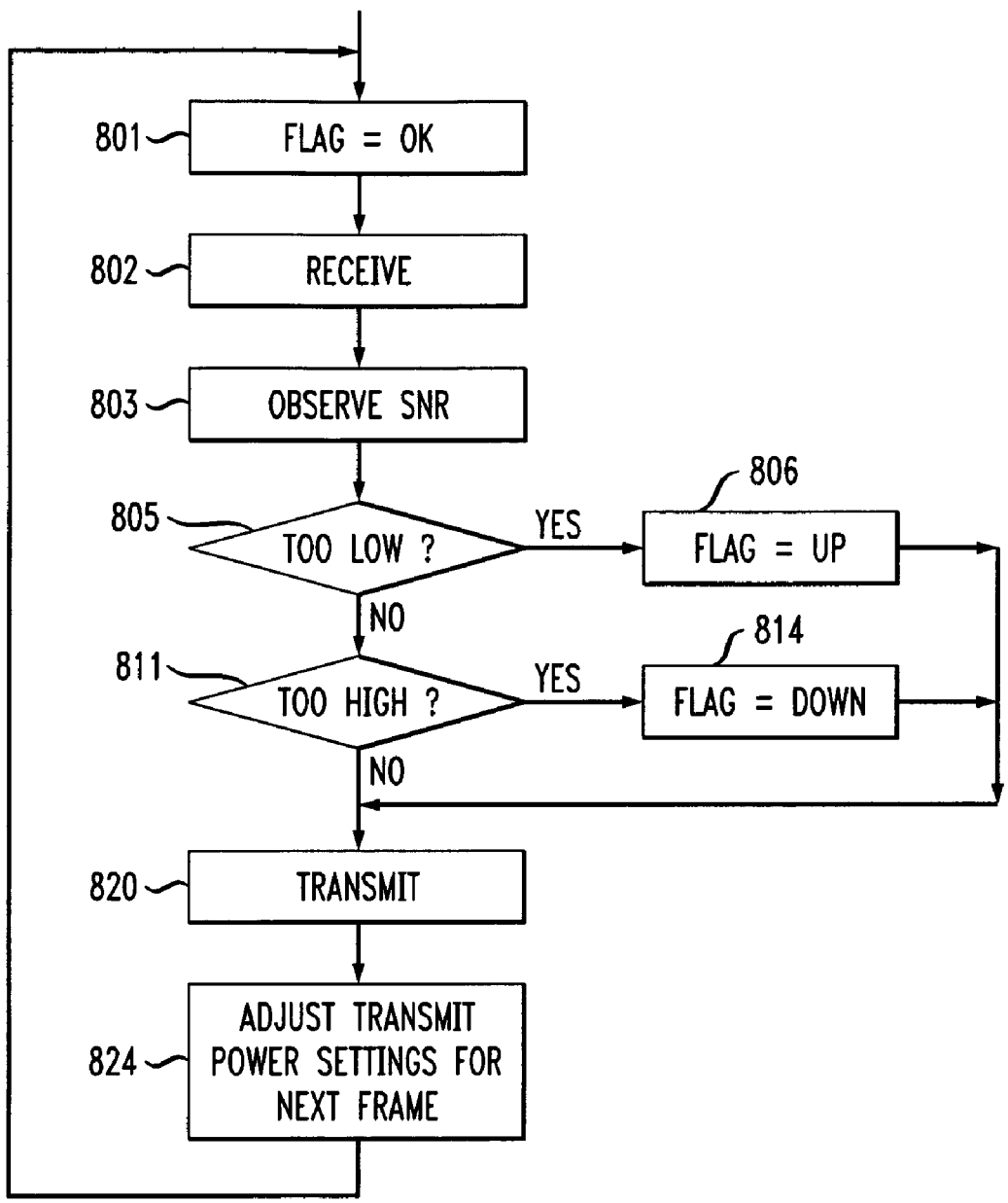
FIG. 8 shows an adaptive power control technique illustratively used in the systems of FIGS. 1-2 and FIGS. 5-6.

This technique—which can be used in either the system of FIGS. 1-2 or the system of FIGS. 5-6—is illustrated in FIG. 8. A variable called FLAG is set to "OK" at step 801. During the half-frame that the circuitry at one end of the link is receiving, as indicated at step 802, it observes the signal-to-noise ratio (SNR) of its received signals as measured at, for example, the decoder inputs, as indicated at step 803. If the SNR is determined at step 805 to be too low, i.e., not adequate to ensure the desired level of error rate performance, FLAG is set to a new value, "UP" at step 806. On the other hand, if the SNR is determined to be too high, i.e., greater than that required to ensure the desired level of error rate performance, as determined at step 811, FLAG is set to a new value, "DOWN" at step 814. Data is thereafter transmitted in the second half of the frame, at step 820, but without making any transmit power adjustment at this time. Only thereafter, at step 824 is an adjustment to the transmit power settings made—increasing the power if FLAG=UP and decreasing it if FLAG=DOWN.

The following table summarizes different combinations of antenna, modulation and coding techniques that can be used in systems embodying the principles of the invention. For all three examples, a symbol rate of 414 Mbaud is assumed, with the same transmit and receive filtering, namely root-cosine-rolloff filters at each end with half-power bandwidth of 414 MHz and a rolloff factor 0.17. In this table, the column "Required SNR" provides an indication of the signal-to-noise ratio that the system requires be characteristic of the signals output by the MIMO combiner in order for the system to achieve a bit error rate of $10^{-12}$. The first and third examples correspond to the embodiments of FIGS. 1-2 and FIGS. 5-6, respectively.

The spectral efficiency corresponding to the three cases (OC-12, OC-24 and OC-48) are 1.25 b/s/Hz, 5 b/s/Hz, and 10 b/s/Hz, respectively.

| Transmission | Modulation | Coding | Antennas | Required SNR |
|---|---|---|---|---|
| OC-12 (622 Mb/s) | QPSK | rate ¾ convolutional coding | non-polarized | 8 dB |
| OC-24 (1.244 Gb/s) | QPSK | rate ¾ convolutional coding | dual-polarized; preferably slant 45° | 8 dB |
| OC-48 (2.488 Gb/s) | 16-QAM | ¾ rate trellis coded modulation | dual-polarized, preferably slant 45° | 14 dB |

The foregoing merely illustrates the principles of the invention and many variations are possible. The disclosed embodiment uses a 2×2 MIMO antenna system. However, other MIMO antenna arrangements, including arrangements having more than two antennas at one or both ends of the link, can be used, depending on the needs of the particular application in terms of bit rate, error rate, expected atmospheric conditions, etc. It should be noted, in particular, that the same number of antennas at both ends of the link is not necessary.

Although TDD is used in the illustrative embodiment, the invention could also be implemented in a frequency division duplex system in which a different frequency band is used for each direction of communication.

Particular modulation techniques, coding techniques, antenna polarization arrangements, bit rates, bandwidths, wavelengths, frequencies, and other parameters characterize the embodiments shown or described herein. These are all merely illustrative. Thus, for example, the illustrative examples disclosed herein use standard SONET bit rates. However parameter values conventionally in use in other kinds of systems are equally appropriate, such as 100 Mb/s for 100bT Ethernet over a 50 MHz band. All examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The block diagrams herein represent conceptual views of illustrative circuitry embodying the principles of the invention. Thus the functions of the various elements shown in the FIGS. may be provided through the use of dedicated hardware as well as hardware capable of executing software in association with appropriate software. The functions of those various elements may be implemented by, for example, digital signal processor (DSP) hardware, network combiner, application specific integrated circuit (ASIC), field programmable gate array (FPGA), read-only memory (ROM) for storing software, random access memory (RAM), and non-volatile storage. Other hardware, conventional and/or custom, may also be included. Thus the term "circuitry" as used herein is intended to refer to arrangements of any of these or other types capable of performing the function(s) described.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

Similarly, it will be appreciated that the flowchart shown herein represents various processes which may be substantially represented in computer-readable medium and so executed by a computer or combiner, whether or not such computer or combiner is explicitly shown. Moreover, in the flowchart shown herein, the various blocks can be understood as representing not only processing and/or other functions but, alternatively, as blocks of program code that carry out such processing or functions.

It will thus be appreciated that those skilled in the art will be able to devise various arrangements which, although not explicitly described or shown herein, embody the principles of the invention and are included within their spirit and scope.

The invention claimed is:

1. Apparatus comprising:
   a first antenna system comprising at least first and second directional antennas installed at respective fixed locations,
   a second antenna system comprising at least third and fourth antennas installed at respective fixed locations, said first and second directional antennas each being aimed at said third and fourth antennas,
   transmitter means for applying to said first antenna a first radio-frequency signal having energy in a particular frequency band and representing a first data stream, and for applying to said second antenna a second radio-frequency signal having energy in said particular frequency band and representing a second data stream,
   said first and second antennas being located with respect to each other and with respect to said second antenna system in such a way that at least two versions of said first radio-frequency signal, having substantially different phases, arrive at said second antenna system with substantially no multipath diversity and in such a way that at least two versions of said second radio-frequency signal, having substantially different phases, arrive at said second antenna system with substantially no multipath diversity,
   wherein said at least two versions of said first radio-frequency signal arrive at said third and fourth antennas, respectively, and wherein said at least two versions of said second radio-frequency signal arrive at said fourth and third antennas, respectively.

2. The invention of claim 1 wherein said at least two versions of said first radio-frequency signal traverse paths differing in length by $d_a$, wherein said at least two versions of said second radio-frequency signal traverse paths differing in length by $d_b$, and wherein $d_a + d_b = n\lambda/2$, where $\lambda$ is a wavelength within said particular frequency band and n is an odd integer.

3. The invention of claim 1 wherein said frequency band has a lower limit of at least 1.5 GHz.

4. The invention of claim 1 wherein said first antenna system is at least 1.5 km mile distant from said second antenna system and wherein said first and second antennas are separated from one another by at least 1 meter.

5. The invention of claim 1 wherein said transmitter means is adapted to independently channel-encode said first and second data streams and to modulate the encoded first and second data streams to generate said first and second radio-frequency signals.

6. The invention of claim 1 wherein said transmitter means includes
   means for applying to said first antenna a third radio-frequency signal having energy in said particular frequency band and representing a third data stream, and wherein said first antenna transmits said first radio-frequency signal with a first polarization and said third radio-frequency signal with a second polarization and
   means for applying to said second antenna a fourth radio-frequency signal having energy in said particular frequency band and representing a fourth data stream, and wherein said second antenna transmits said second radio-frequency signal with a first polarization and said fourth radio-frequency signal with a second polarization.

7. The invention of claim 1 wherein said first antenna system is fixed at a distance D from said second antenna system and said first and second antennas are fixed at a distance $L_1 = \lambda D/2 L_2$ from one another, where $\lambda$ is a wavelength within said frequency band and $L_2$ is the distance between said third and fourth antennas.

8. The invention of claim 7 wherein D is at least 1.5 km and wherein $\lambda$ is about 24 millimeters or less.

9. The invention of claim 1 wherein said apparatus includes receiver means for processing radio-frequency signals within said frequency band received at said first antenna system.

10. The invention of claim 1 wherein said first and second data streams have a combined bit rate of at least 622 Mb/s.

11. Apparatus comprising
    a first antenna system comprising at least first and second directional antennas installed at respective fixed locations,
    a second antenna system comprising at least third and fourth antennas installed at respective fixed locations, said first and second directional antennas each being aimed at said third and fourth antennas,
    transmitter means for applying to said first antenna a first radio-frequency signal having energy in a particular frequency band and representing a first data stream, and for applying to said second antenna a second radio-frequency signal having energy in said particular frequency band and representing a second data stream,
    said first and second antennas being located with respect to each other and with respect to said second antenna system in such a way that at least two versions of said first radio-frequency signal, having substantially different phases, arrive at said second antenna system and in such a way that at least two versions of said second radio-frequency signal, having substantially different phases, arrive at said second antenna system, wherein the version of said first radio-frequency signal arriving at said fourth antenna is phase-delayed relative to the version arriving at said third antenna by a first phase delay, wherein the version of said second radio-frequency signal arriving at said third antenna is phase-delayed relative to the version arriving at said fourth antenna by a second phase delay, and wherein the sum of said first and second phase delays is substantially equal to an odd multiple of 180 degrees.

12. Apparatus comprising a first and second antenna systems installed at respective fixed locations, the first antenna system being a directional antenna system aimed at the second antenna system, transmitter circuitry adapted to apply to said first antenna system at least first and second first radio-frequency signals A and B having energy in a particular frequency band and representing first and second data streams, respectively, said first and second antenna systems being such that signals A, $\overline{A}$, B and $\overline{B}$ arrive at said second antenna system, signal $\overline{A}$ being a phase-delayed version of signal A and signal $\overline{B}$ being a phase-delayed version of signal B, and receiver circuitry adapted to process the signals that arrive at said second antenna system in such a way as to recover said first and second data streams, wherein each of said antenna systems comprises two or more spaced-apart antennas, wherein signal A is applied to a first antenna of said first antenna system, signal B is applied to a second antenna of said first antenna system, said signals A and $\overline{B}$ arrive at a first antenna of said second antenna system and said signals B and $\overline{A}$ arrive at a second antenna of said second antenna system.

13. The invention of claim 12 wherein signal $\overline{A}=-jA$, signal $\overline{B}=-jB$, and wherein said receiver circuitry includes MIMO combining means for recovering said first data stream from a signal that is a function of $(S_1+jS_2)$ and for recovering said second data stream from a signal that is a function of $(S_2+jS_1)$, where $S_1=(A-jB)$ and $S_2=(B-jA)$.

14. The invention of claim 12 wherein signal $\overline{A}=-jA$, signal $\overline{B}=-jB$, and wherein said receiver circuitry includes MIMO combining means for recovering said first data stream from a baseband signal that is a function of $(S_1+jS_2)$ and for recovering said second data stream from a baseband signal that is a function of $(S_2+jS_1)$, where $S_1=(A-jB)$ and $S_2=(B-jA)$.

15. The invention of claim 13 wherein the superposition of said signals A and $\overline{B}$ is received as said signal $S_1$ at the first antenna of said second antenna system and the superposition of said signals B and $\overline{A}$ is received as said signal $S_2$ at the second antenna element of said second antenna system.

16. The invention of claim 12 wherein said first antenna system is fixed at a distance D from said second antenna system, said first and second antennas of said first antenna system are fixed at a distance $L_1$ from one another, said first and second antennas of said second antenna system comprise a pair of antennas that are fixed at a distance $L_2$ from one another, and wherein $L_1L_2=\lambda D/2$, where $\lambda$ is a wavelength within said frequency band.

17. The invention of claim 16 wherein D is at least 1.5 km and wherein $L_1$ and $L_2$ are each on the order of between 1 and 10 meters.

18. The invention of claim 16 wherein $\lambda$ is about 24 millimeters or less.

* * * * *